United States Patent [19]

Kishino

[11] 4,149,147

[45] Apr. 10, 1979

[54] LUMINESCENT CHARACTER DISPLAY DEVICE

[75] Inventor: Takao Kishino, Mobara, Japan

[73] Assignee: Futaba Denshi Kogyo K.K., Chiba, Japan

[21] Appl. No.: 787,924

[22] Filed: Apr. 15, 1977

[30] Foreign Application Priority Data

Apr. 15, 1976 [JP] Japan .................................. 51-41834
Apr. 30, 1976 [JP] Japan .................................. 51-53336[U]

[51] Int. Cl.$^2$ .................................. G06F 3/14

[52] U.S. Cl. .................................. 340/760; 313/483; 315/169.3; 340/781; 340/802

[58] Field of Search .............. 340/336, 324 R, 324 M; 315/169 R, 169 TV; 313/483, 496, 505, 510, 491, 519

[56] References Cited

U.S. PATENT DOCUMENTS

| | | | |
|---|---|---|---|
| 3,824,582 | 7/1974 | Glaser et al. | 340/324 M |
| 3,868,676 | 2/1975 | Hennessey et al. | 340/336 |
| 3,873,870 | 3/1975 | Fukushima et al. | 340/336 |
| 4,066,929 | 1/1978 | Okamoto et al. | 340/324 M |

*Primary Examiner*—Marshall M. Curtis
*Attorney, Agent, or Firm*—Oblon, Fisher, Spivak, McClelland & Maier

[57] ABSTRACT

A luminescent character display device having an insulating base plate, a pattern display section formed on the base plate and composed of a plurality of subsections, one for each digit, the sub-section being formed of a plurality of anodes disposed in a matrix form and each coated with a fluoroescent layer, a plurality of anode wires coated on the base plate and disposed so that they pass the corresponding positions of the respective sub-sections of the pattern display section, an insulating layer laminated on the anode wires and provided with through-holes leading to the anode wires, said anodes being coated on the insulating layer, the anodes disposed at the corresponding positions of the respective sub-sections of the pattern display section being electrically connected in common through the respective anode wires connected thereto through the through-holes, primary grids provided above the anodes, one for each digit, filament cathodes provided above the primary grids for emitting thermions, wherein the anodes are selectively given anode voltage for display.

6 Claims, 10 Drawing Figures

LUMINESCENT CHARACTER DISPLAY DEVICE

BACKGROUND OF THE INVENTION

1. Field of the Invention

The present invention relates to a luminescent character display device and, more particularly, to a fluorescent character display device having a plurality of anodes disposed in a matrix form and each coated with a fluorescent layer thereon and adapted to display multi-digit characters, symbols, graphic patterns, etc. by selectively actuating the above-mentioned anodes.

2. Description of the Prior Art

A multi-digit fluorescent display tube now widely used has a pattern display section composed of a plurality of sub-sections for the respective digits, each sub-section being formed, for instance, of seven segment anodes disposed in the form of the letter "8" and each coated with a fluorescent layer, and produces the display of each digit by selectively actuating three segment anodes.

This segment-type display device has advantage in that it can display ten figures from 1 to 9 for each digit using a small number of segment anodes; however, it is difficult for the device to display various characters except these figures.

Under these circumstances, a fluorescent display tube is being put into practical use, which has a sub-section for each digit of the pattern display section composed of eight segment anodes disposed in a lattice form or of sixteen segment anodes disposed in a lattice form with diagonals and which actuates these segment anodes thereby performing fluorescent character display.

However, the characters displayed by these segment-type devices are inevitably become unnatural in shape and therefore are illegible. In addition, the characters that can be displayed by these segment-type devices are limited to, for instance, figures and a part of alphabetical characters; thus it is difficult for these devices to display various characters, symbols, graphic patterns etc. at will.

In order to eliminate these disadvantages of the conventional segment-type display devices, there has been proposed a dot-type display device which has a pattern display section composed of a plurality of sub-sections for the respective digits, each sub-section for digit being formed of a plurality of dot-shaped anodes disposed in a matrix form and each coated with a fluorescent layer, and which performs luminescent character display by selectively actuating these anodes.

However, this dot-matrix type fluorescent display tube requires a great number of dot-shaped anodes with fluorescent layers and connecting wires thereof, which are accompanied by difficulties in production. In addition, it requires a great number of drive circuits for selectively actuating the above-mentioned dot-shaped anodes with the result that it becomes complicated in construction and therefore high in cost.

SUMMARY OF THE INVENTION

It is an object of the present invention to provide a luminescent character display device of the dot-matrix type which can eliminate the above-mentioned disadvantages of the prior art.

It is another object of the present invention to provide a luminescent character display device of the dot-matrix type simple in construction and easy to produce.

It is still another object of the present invention to provide a luminescent character display device of the dot-matrix type which can display desired characters, graphic patterns, etc. using a small number of drive circuits.

According to one aspect of the present invention, there is provided a luminescent character display device having a pattern display section composed of a plurality of sub-sections, one for each digit, said sub-section for each digit being formed of a plurality of anodes disposed in a matrix form and each coated with a fluorescent layer, and said anodes being selectively given anode voltage for display, which comprises a display tube section composed of an insulating base plate, a plurality of anode wires coated on said base plate and disposed so that they pass the corresponding positions of the respective sub-sections of the pattern display section, an insulating layer laminated on said anode wires and provided with through-holes leading to said anode wires, a plurality of anodes disposed on the insulating layer in a matrix form so as to form the sub-section for each digit of the pattern display section, the anodes disposed at the corresponding positions of the respective sub-sections of the pattern display section being electrically connected in common through the respective anode wires connected thereto through the through-holes, each of said anodes being coated with a fluorescent layer, primary grids provided above said anodes, one for each digit, filament cathodes provided above said primary grids for emitting thermions.

In further accordance of the present invention, there is provided a plurality of strip-shaped second grids disposed on said insulating layer intersectionally with said anode wires and provided with a plurality of windows surrounding the respective anodes on said anode wires.

In still further accordance of the present invention, there is provided an anode-selecting circuit for giving display information to said anode wires, a primary-grid-selecting circuit for selecting the primary grids in a time-sharing manner, and a second-grid-selecting circuit for selecting said second grids in a time-sharing manner during a period when the primary grids are being selected.

DESCRIPTION OF THE PREFERRED EMBODIMENTS

Now the present invention will be hereinafter described in detail with reference to the drawings.

Figure 1:
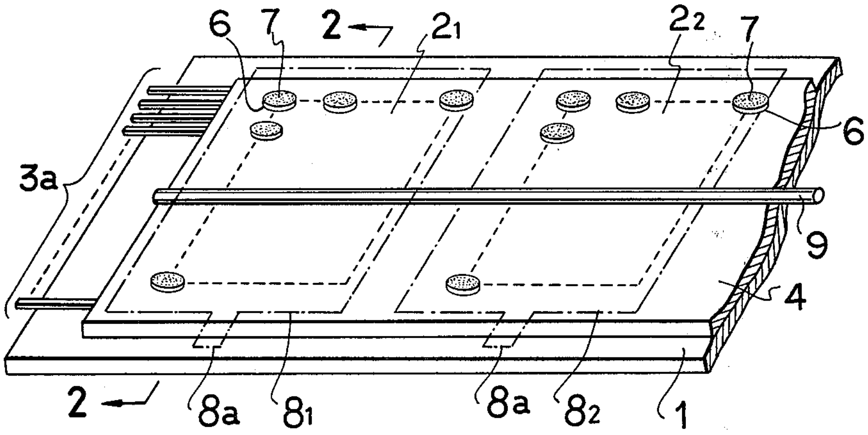
FIG. 1 is a perspective view of the essential part of a luminescent character display device according to the first embodiment of the present invention.
Figure 2:
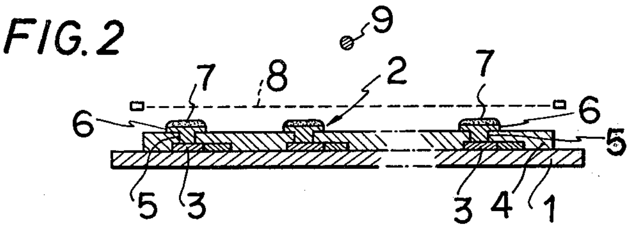
FIG. 2 is a sectional end view taken along line 2—2 of FIG. 1.
Figure 3:
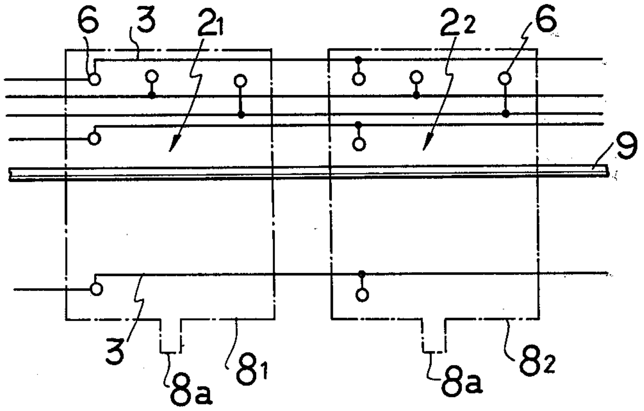
FIG. 3 is a connection diagram of electrodes according to the first embodiment of the present invention.

Reference is now made to FIGS. 1, 2, and 3 to explain the first embodiment of the present invention.

Numeral 1 designates a base plate made of insulating material such as ceramics and glass. Numeral 2 designates a pattern display section adapted to display a required number of digits and composed of a plurality of sub-sections $2_1$, $2_2$, . . . , arranged on the base plate 1 along its longitudinal direction. Numeral 3 designates a plurality of anode wires of conductive material which were coated on the base plate 1 by, for instance, screen printing. Each of these anode wires 3 is arranged according to the number of anodes to be described later which constitute a digit or sub-section of the pattern display section 2; and in addition, the anode wires 3 are strip-shaped, being formed parallel with one another in the longitudinal direction of the base plate so that they electrically connect the corresponding anodes of the sub-sections of the pattern display section 2, respectively. Further, the anode wires 3 are connected to external terminals 3*a*, respectively; in this case, the direction of the external terminals 3*a* may be either parallel or vertical to the longitudinal direction of the base plate 1.

Reference numeral 4 designates an insulating layer laminated on the anode wires 3, the insulating layer 4 having through-holes 5 leading to the anode wires 3. Numeral 6 designates anodes of conductive material formed in the through-holes 5 by, for instance, screen printing which involves printing and baking. The anodes 6 are electrically connected to the anode wires 3, because the conductive material thereof is filled in the through-holes 5 when formed. As mentioned above, the anode wires 3 are so arranged that they electrically connect the corresponding anodes 6 of the sub-sections of the pattern display section 2, and therefore each anode wire 3 can establish connection with the anodes 6 corresponding in number to the digits of the pattern display section 2 as is apparent from FIG. 3 which shows a connection diagram of the anodes. The anodes 6 are preferably made of a conductive mixture formed by mixing low melting-point glass-frit or the like with such a conductive material as having a high affinity for fluorescent material to be coated thereon. Numeral 7 designates a fluorescent layer coated and formed on the upper surface of each anode 6. This layer 7 may be formed by, for instance, screen printing which involves baking, etc.

In this manner, the anodes 6, coated with the fluorescent layers 7, of each sub-section or digit of the pattern display section 2 are separately connected to the external terminals 3*a*, respectively; and, in addition, the anodes 6 disposed at the corresponding positions of the respective sub-sections of the pattern display sections 2 are mutually electrically connected.

Reference numeral 8 generally designates a plurality of primary grids $8_1$, $8_2$, . . . , provided for the respective sub-sections or digits of the pattern display section 2 independently of one another near and above the anodes 6 coated with the fluorescent layers 7. Each grid 8 is supported and fixed by a supporter not shown, being formed of, for instance, a net of very fine meshes so that the pattern display section 2 may be clearly seen from above. The grids 8 are separately connected to external terminals 8*a*, respectively.

Reference numeral 9 designates one or a plurality of filament cathodes provided above and opposite to the primary grids 8, supported by a supporter not shown, and heated by a power source imparted thereto through external terminals (not shown) to emit thermions.

The anodes, cathodes and grids mentioned above are airtightly enclosed in a casing (not shown) made of, for instance, glass through which the external terminals of the anodes, cathodes and grids are airtightly penetrated. The casing is evacuated so as to maintain its inside at a high vacuum.

The operation of the above-mentioned embodiment will be hereinafter described.

As mentioned above, each of the sub-section $2_1$, $2_2$, . . . , or digits of the pattern display section 2 is provided with a required number of the anodes 6 each coated with the fluorescent layer 7 and arranged in the form of a matrix; and in addition the anodes 6 disposed at the corresponding positions of the sub-sections $2_1$, $2_2$, . . . of the pattern display section 2 are connected in common through each of the anode wires 3 and further connected to each of the external terminals 3*a*; and the primary grids 8 ($8_1$, $8_2$, . . .) corresponding to the respective sub-sections $2_1$, $2_2$, . . . of the pattern display section 2 are connected to the respective external terminals 8*a* independently of one another. In order to actuate the luminescent character display device mentioned above, therefore, a power source is first given to the filament cathode or cathodes 9 through an external terminal (not shown) to heat the cathode or cathodes 9. Meanwhile, digit-selecting signals are successively and selectively supplied to the primary grids 8 ($8_1$, $8_2$, . . .) through the external terminals 8*a*; and, in addition, display data are given to the anodes 6 through the external terminals 3*a* of the anode wires 3. According to a character symbol to be displayed which is determined by the above display data, anode voltage is selectively given, for instance, to the anodes 6 of the sub-section $2_1$ of the pattern display section 2; thermions emitted from the filament cathode or cathodes 9 are accelerated under the influence of the character-selecting signals given to the primary grid $8_1$ and thereby are made to impinge on and penetrate into the anodes 6 and fluorescent layers 7 coated thereon of the sub-section $2_1$ of the pattern display section 2 to make the fluorescent layers 7 excited and luminous. In this case, anode voltage is also applied through the anode wires 3 to the anodes 6 of the pattern display sub-sections $2_2$, $2_3$, . . $2_n$ besides the sub-section $2_1$; however, thermions from the cathode or cathodes 9 do not reach the fluorescent layers 7 coated on the anodes 6 of the pattern display sub-sections $2_2$, $2_3$, . . $2_n$ by the shielding action of the primary grids $8_2$, $8_3$, . . $8_n$ and as a result these fluorescent layers 7 are not made luminous.

When the digit-selecting signals are then shifted from the primary grid $8_1$ to the subsequent primary grid $8_2$ and at the same time anode voltage is applied to the pattern display sub-section $2_2$ through the anode wire 3 according to a character symbol to be displayed, the pattern display sub-section $2_2$ alone is made to excite and luminesce in a similar manner mentioned above.

In this manner, the digit-selecting signals are given to each of the primary grids 8 successively and selectively, and simultaneously the display data to be given to the anode wires are switched synchronously with the digit-selecting signals; thus the display of each digit is performed in a time-sharing manner.

Thus, character symbols required are displayed on the respective sub-sections of the pattern display section 2. In this case, the character symbols are displayed on the fluorescent layers 7 coated on the anodes 6 arranged in the form of a matrix by the selective luminescence of the fluorescent layers 7; therefore complicated character symbols, delicate figures, etc. may be clearly displayed in a natural form by increasing the number of anodes 6 arranged in each sub-section of the pattern display section 2.

The duty of each sub-section of the pattern display section 2 is determined by the number of digits, having nothing to do with the number of the anodes of the sub-section. In other words, the duty of each sub-section of the pattern display section 2 is not changed even if the number of the anodes 6 thereof is increased for the purpose of displaying more complicated character symbols, and therefore the luminescence of each fluorescent layer 7 can be maintained at a required level even if the crest value of anode voltage is not increased.

Accordingly, the above-mentioned luminescent character display device may be actuated on a low voltage as in the case of, for instance, a segment-type character display device heretofore widely used; therefore it can be easily actuated by the use of the existing driving circuit and, in addition can be easily connected to the existing equipment. Besides, it has excellent features that, when in use with a dot-type data recorder such as thermal printer or ink-jet printer, it can be easily connected to such a recorder and can effectively check the recorded contents, since the logic circuit can be used in common.

The second embodiment of the present invention will be hereinafter described with reference to FIGS. 4, 5, 6, 7, and 8.

Figure 4:
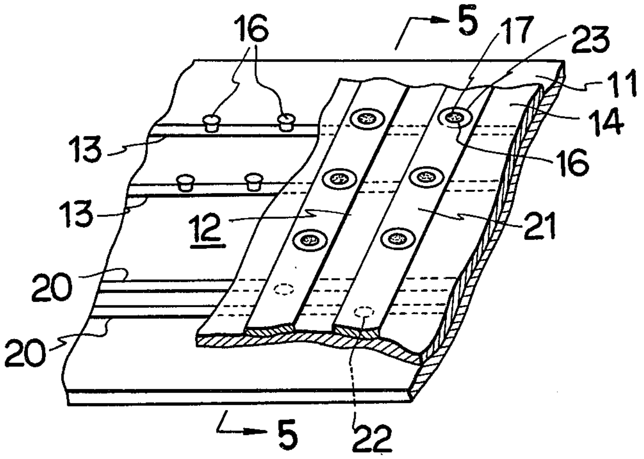
FIG. 4 is a fragmentary perspective view of the essential part of a luminescent character display device according to the second embodiment of the present invention.
Figure 5:
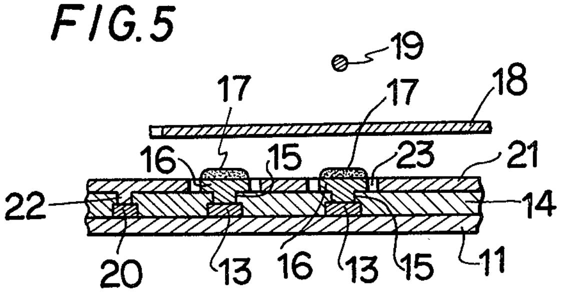
FIG. 5 is a sectional end view taken along line 5—5 of FIG. 4.

FIG. 4 is a fragmentary perspective view of the essential part of the luminescent character display device according to the second embodiment of the present invention, and FIG. 5 is a sectional view taken along the line 5-5 of FIG. 4. Reference numeral 11 designates a base plate formed of an insulating board made of ceramics, glass or the like. Numeral 13 designates a plurality of strip-shaped anode wires made of conductive material coated and formed in stripes on the base plate 11 by, for instance, screen printing which involves printing, drying and baking processes. These anode wires are arranged at predetermined intervals on the base plate 11 in its lateral direction. The interval and number of the anode wires are properly determined according to the character symbols or figure patterns to be displayed; and, with the decrease of the interval of the anode wires 13 and increase of the number thereof, the character symbols or figure profiles that can be displayed become greater in number, and in addition the display in natural forms becomes possible. Numeral 20 designates a plurality of grid wires used for second grids to be described later, which are formed in the same manner as the anode wires 13. Numeral 14 designates an insulating layer coated and formed on the anode wires 13 and the second-grid wires 20 by, for instance, screen printing which involves printing, drying and baking processes, as in the case of the wires 13 and 20. Through-holes 15 leading to the anode wires 13 are provided at predetermined intervals on the insulating layer 14 and, in addition, through-holes 22 leading to the second-grid wires 20 are provided also on the insulating layer 14. Reference numeral 16 designates a plurality of anodes made of conductive material coated and formed by, for instance, screen printing which involves printing, drying and baking processes. The anodes 16 are electrically connected to the respective anode wires 13, since they are formed by filling their conductive material in the through-holes 15 during printing. Thus the anode wires 13 electrically connect together, respectively, the associated anodes 16 independently disposed. The anodes 16 are preferably made of a conductive mixture formed by mixing a conductive material such as graphite with such a material as low melting-point glass frit having a high affinity for fluorescent material to be deposited thereon.

Reference numeral 21 designates a plurality of strip-shaped second grids disposed in the form of stripes at predetermined intervals in the longitudinal direction vertically to the anode wires 13, having windows for receiving the anodes 16, and electrically insulated from the anode wires 13 by the insulating layer 14. The second grids 21 are also made of conductive material printed by, for instance, screen printing which involves drying and baking processes; and are electrically connected to the respective second-grid wires 20, since they are printed so that the conductive material thereof are stuffed in the through-holes 22. The anodes 16 and the second grids 21 may be simultaneously formed by screen printing for simplification of the forming process and more accurate and easier positioning; in this case, they are positioned flush with each other.

Reference numeral 17 designates fluorescent layers coated on the respective anodes 16. The fluorescent layers 17 may be formed by screen printing which involves drying and baking processes; thus, all the above processes may be performed integratedly by screen printing with greater simplicity. In addition, the fluorescent layer 17 can be securely coated on the anode 16, since the anode 16 may be made of any conductive material having a high affinity for the fluorescent layer 17 as mentioned above.

In this manner, the sub-section of a pattern display section 12 for each digit is formed, which is composed of a group of the anode wires 13 and second grids 21 arranged in a matrix form, and the anodes 16 coated with the fluorescent layers 17 and disposed at the intersections of the above-mentioned matrix-shaped group of the anodes 13 and second grids 21.

Reference numeral 18 designates a primary grid for each digit, which is disposed above and near the anodes 16. Each primary grid 18 is formed of, for instance, a net-shaped metal so as to permit a clear view of the pattern display section 12 from above. In addition, the primary grids 18 are disposed independently of each other for each digit or the subsection of the pattern display section 12, being supported by supports (not shown). One or a plurality of cathodes 19 are provided above and opposite to the primary grids 18, being supported by supports (not shown).

Figure 6:
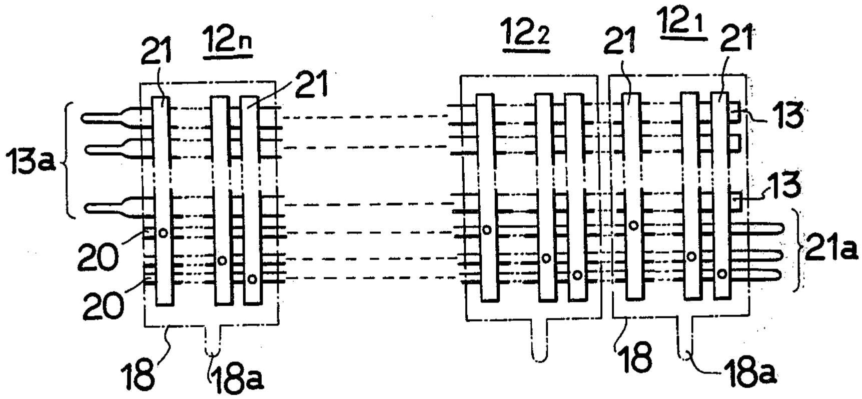
FIG. 6 is a skeleton diagram of the essential part of the device shown in FIG. 3.

In FIG. 4, shown is only one digit or sub-section of the pattern display section 12. A required number of sub-sections of the pattern display section 12 corresponding to the number of digits are disposed side by side on the base plate 11 in its longitudinal direction. FIG. 6 shows the arrangement of the anode wires 13, second-grid wires 20 and primary grids 18 in the case where the number of digits or sub-sections of the pattern display section 12 is n, that is the sub-sections $12_1$, $12_2$, . . $12_n$ are provided. As is apparent from FIG. 6, the anode wires 13 are connected in common for each row, being further connected to the respective external terminals 13a. On the other hand, the corresponding second grids 21 of each digit or sub-section are connected in common, being further connected to the respective external terminals 21a. The primary grids 18 are connected to the respective external terminals 18a independently of each other. The cathodes 19 are also connected to the external terminals 19a (FIG. 7).

The anodes, cathodes, grids, etc., mentioned above are airtightly enclosed in a casing (not shown) made of, for instance, glass through which the external terminals 13a, 21a, 18a and 19a are airtightly penetrated. The casing is evacuated so as to maintain its inside at a high vacuum suitable for the operation of an electron tube. Thus formed is a display tube section 24 (FIG. 7) for performing multi-digit character display.

A drive circuit for actuating the display tube section 24 will be described hereinafter with reference to FIG. 7, in which the display tube 24 is represented by its external terminals for simplicity.

Figure 7:
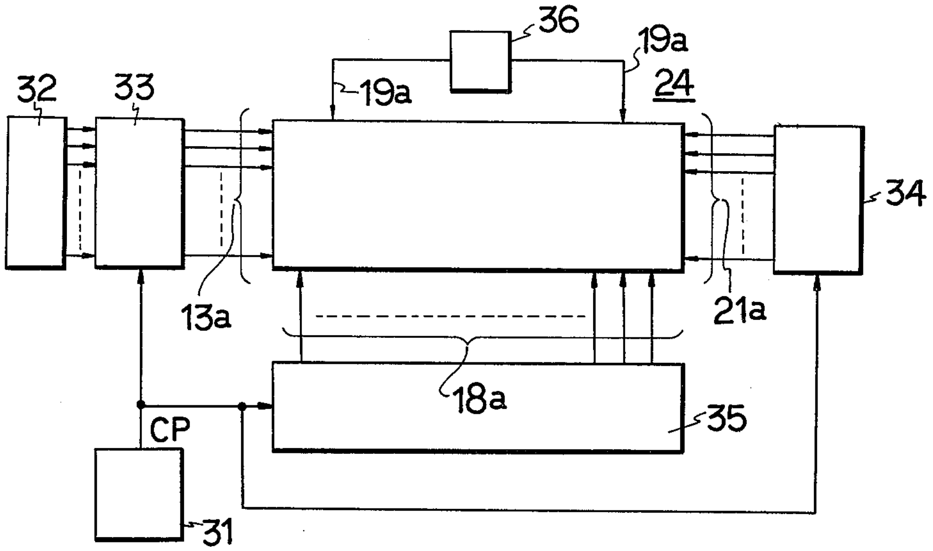
FIG. 7 is a driving circuit diagram for use with the device shown in FIG. 4.

In FIG. 7, the reference numeral 31 designates a pulse-generating circuit for generating clock pulses which provide the reference of the whole operation, 32 a register for memorizing information with regard to various data such as characters and figures to be displayed, and 33 an anode-selecting circuit for decoding the memory contents of the register 32 to give them to the external terminals 13a of the anode wires 13 of the display tube section 24. Reference numeral 34 designates a second-grid-selecting circuit which receives clock pulses outputted from the pulse-generating circuit 31 thereby successively giving actuating signals to the external terminals 21a of the display tube 24 to selectively actuate the second grids 21. Reference numeral 35 designates a primary-grid-selecting circuit which receives clock pulses outputted from the pulse-generating circuit 31 thereby successively giving actuating signals to the external terminals 18a of the display tube section 24 to selectively actuate the primary grids 18. Reference numeral 36 denotes a power source connected to the external terminals 19a of the cathodes 19 to heat the latter for emission of thermions.

Figure 8:
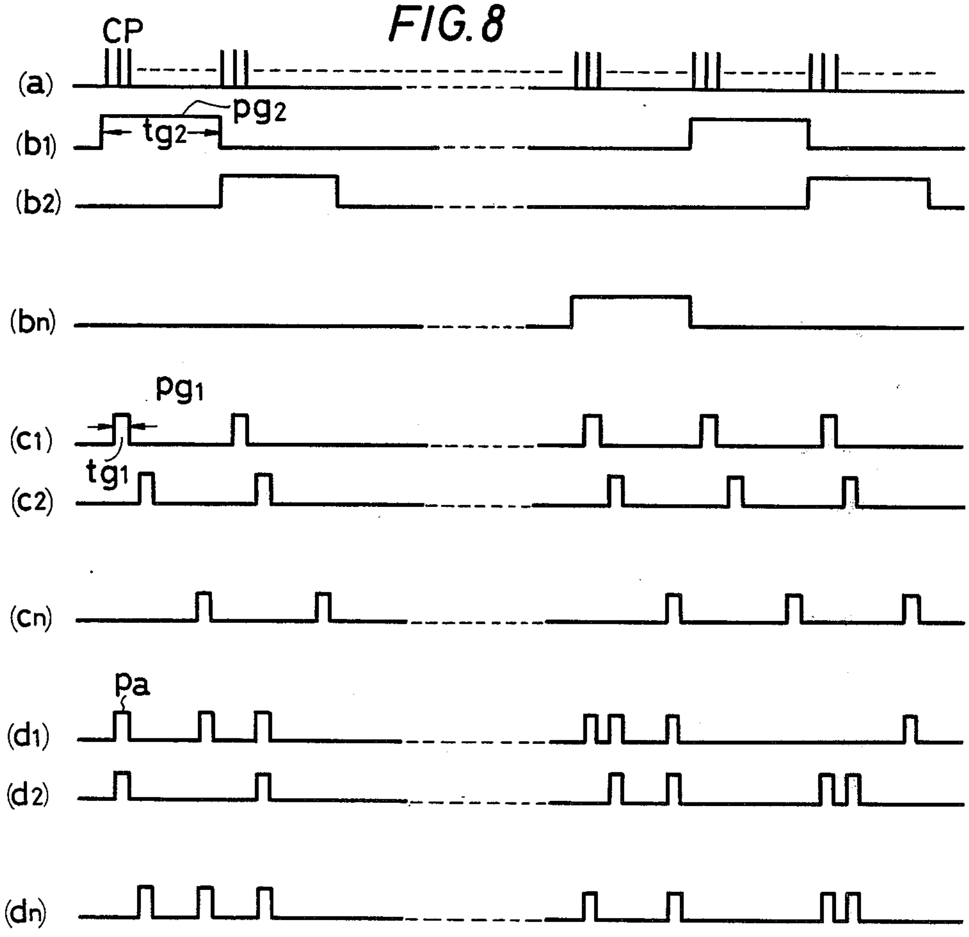
FIG. 8 is a timing diagram explanatory of the operation of the device shown in FIG. 4.

In operation, the pulse-generating circuit 31 generates clock pulses CP at predetermined intervals as shown in FIG. 8 (*a*). As mentioned above, these clock pulses CP are given to each of the foregoing circuits. The primary-grid-selecting circuit 35 counts the clock pulses CP and thereby successively and selectively applies pulses $P_{g2}$ to the primary grids 18, the pulses $P_{g2}$ having a time width $t_{g2}$ sufficient to actuate each digit of the pattern display section 12 as shown in FIGS. 8 ($b_1$) to 8 ($b_n$). In other words, digit selection is performed by the pulses $P_{g2}$ outputted from the primary-grid-selecting circuit 35. This digit selection is performed successively from the first digit to the n-th digit of the pattern display section 12; this process being repeated.

On the other hand, the second-grid-selecting circuit 34 receives the clock pulses CP and thereby generates pulses $P_{g1}$ having a time width $t_{g1}$ sufficient to actuate each anode 16 coated with the fluorescent layer 17 as shown in FIGS. 8 ($c_1$) to 8 ($c_n$), and gives the pulses $P_{g1}$ selectively to the second grids 21. These pulses $P_{g1}$ are generated so that they may perform a cycle of the selective scanning of the second grids 21 of each digit while the pulses $P_{g2}$ are being generated. Therefore, each of the second grids 21 is scanned once during the duration of each pulse $P_{g2}$. More particularly, the primary grid 18 of each digit is scanned by the pulses $P_{g2}$ in a time-sharing manner; and, in addition, the second grids 21 are scanned by the pulses $P_{g1}$ in a time-sharing manner while each primary grid 18 is being selected — that is, double scanning is carried out.

In addition, the anode-selecting circuit 33 receives the clock pulses CP, and thereby decodes and successively reads out the display information stored in the register 32 to give pulses Pa having the same pulse width as the pulses $P_{g1}$ to the anode wires 13 as shown in FIGS. 8 ($d_1$) to 8 ($d_n$).

In a digit selected by the pulses $P_{g2}$ outputted from the primary-grid-selecting circuit 35, thermions emitted from the filament cathodes 19 are accelerated to impinge on the fluorescent layers 17 coated on the anodes 6 positioned at the intersections between the second grids 21 selected by the second-grid-selecting circuit 34 and the anode wires 13 imparted with the pulses Pa outputted from the anode-selecting circuit 33; thus the above fluorescent layers 17 are energized to luminesce. On the other hand, thermions do not arrive at the fluorescent layers 7 of the anodes 6 positioned at each digit not selected by the primary grids 18 and those of the anodes 16 positioned at each digit selected by the primary grid 18 but not imparted at its second grids 21 with pulses $P_{g1}$, by the shielding action of the primary and second grids 18 and 21; therefore these fluorescent layers 17 do not emit light. In the same manner, thermions do not reach the fluorescent layers 17 coated on the anodes 16 positioned at the points where, though selected by the primary and second grids 18 and 21, the anode wires 13 are not imparted with pulses Pa; thus these fluorescent layers 17 also do not emit light.

Thus, each digit is selected by the output pulses $P_{g2}$ of the primary-grid-selecting circuit 35, while the anodes 16 are selected by the second grids 21 and anode wires 13 according to characters, symbols, etc. to be displayed; and thermions emitted from the cathodes 19 impinge on the fluorescent layers 17 of the selected anodes 16 to make them luminescent. Thus the display for one digit is performed.

Besides, the primary grids 18 for the respective digits are successively and selectively actuated by the output pulses $P_{g2}$ of the primary-grid-selecting circuit 35 to display the whole display data stored in the register 32 on the pattern display sub-sections $12_1$ to $12_n$. In this case, if the reference level of the pulses $P_{g1}$ outputted from the second-grid-selecting circuit 34 and that of the pulses $P_{g2}$ outputted from the primary-grid-selecting circuit 35 are set lower than the potential level of the cathodes 19, the leakage luminescence of the fluorescent layers 17 of the anodes 16 not selected can be securely prevented.

If the drive circuits of the type shown in FIG. 7 are adopted, the number of drive circuits that must be provided corresponds to the number of anode wires 13 and second grids 21 arranged and that of the primary grids 18, being very small. With such a small number of drive circuits, a variety of characters, symbols, etc., can be displayed in a natural form, and in addition complicated graphic patterns can be easily displayed.

With the drive circuit shown in FIG. 7, the period when one of the fluorescent layer 17 is energized to luminesce corresponds to the pulse width $t_{g1}$ of the pulse $P_{g1}$ as shown in FIG. 8 ($c_1$). The pulse width $t_{g1}$ is determined by the number of digits of the pattern display section 12 and that of the second grids 21 arranged. Therefore, the increase of the number of digits and/or the increase of the number of the second grids 21 result in the decrease of the pulse width $t_{g1}$ and therefore the lowering of the fluorescent layer luminance. In order to prevent such luminance decrease there occurs a trouble that the amplitude of the pulses Pa applied to the anode wires 13 must be increased.

In order to eliminate such a trouble, the anode wires 13 may be divided into two or a plurality of blocks. In this case, the primary grids 18 of the corresponding digits of the respective blocks are connected in common so that the corresponding digits may be simultaneously selected for display.

Figure 9:
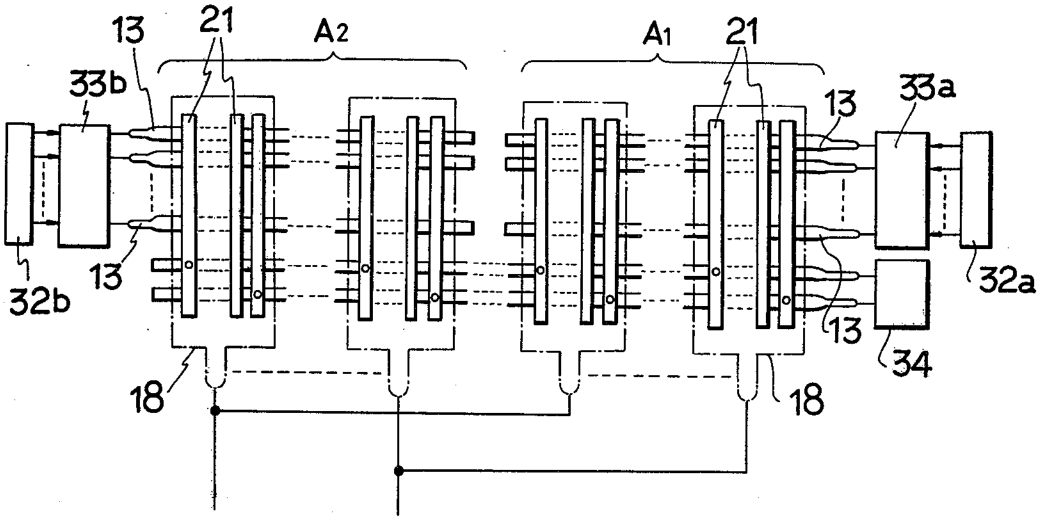
FIG. 9 is a skeleton diagram of the essential part of a luminescent character display device according to the third embodiment of the present invention.

FIG. 9 is a skeleton diagram of an embodiment of the present invention in which the anode wires 13 are divided into two blocks $A_1$ and $A_2$ along the longitudinal direction of the base plate 11; the diagram showing the arrangement of the anode wires 13, second grids 21 and primary grids 18.

In the arrangement shown in FIG. 9, registers 32*a* and 32*b* and anode-selecting circuits 33*a* and 33*b* are required for the anode wire blocks $A_1$ and $A_2$, respectively. However, the capacity of the grid-selecting circuit 35 may be reduced to half as compared with the circuit shown in FIG. 7, and in addition the width $t_{g2}$ of the pulses $P_{g2}$ outputted from the primary-grid-selecting circuit 35 may be doubled; therefore the width $t_{g1}$ of the pulses $P_{g1}$ outputted from the second-grid-selecting circuit 34 may be doubled. Thus, according to the divided drive system shown in FIG. 9, the display luminance can be kept at a desired level without increasing the amplitude of the pulses Pa outputted from the anode-selecting circuit 33, even when the number of digits and that of the second grids 21 are increased.

As a matter of fact, the anode wires 13 may be divided along the lateral direction of the base plate 11.

Figure 10:
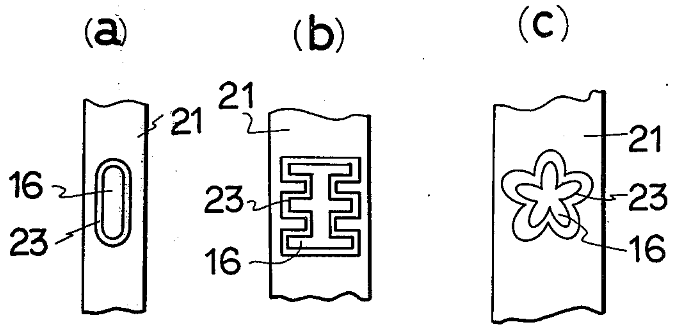
FIGS. 10(*a*), (*b*) and (*c*) are a schematical views of the essential parts of other modifications of the present invention.

In the above-mentioned embodiments, the anodes are shown as disc-shaped; however, they may be of any suitable shape. As shown in FIG. 10 (*a*), for instance, an elliptical anode 16 elongated in the longitudinal direction of the second grid 21 can improve the cut-off characteristic. As shown in FIGS. 10 (*b*) and 10 (*c*), the anodes 16 may be formed in comb-shape or star-shape to improve the cut-off characteristic.

As is apparent from the foregoing description, the luminescent character display device according to the present invention has the following basic features:

The sub-section of the pattern display section for each digit is composed of a plurality of anodes disposed in the form of matrix and each coated with a fluorescent layer; anode wires electrically connect the anodes placed at the corresponding positions of the respective pattern display sub-sections together and in addition connect them to external terminals; the anodes are electrically connected to the anode wires through through-holes provided in an insulating layer formed therebetween; the pattern display sub-sections are provided with primary grids independent of each other, which are actuated in a time-sharing manner by digit-selecting signals given thereto successively and selectively; and display data corresponding to characters, symbols, etc. to be displayed are given to the anodes for display synchronously with the selection of the primary grids.

Therefore, the device according to the present invention has an excellent effect that display may be performed without decreasing the duty of the signals for actuating each pattern display sub-section.

In addition, the device according to the present invention can obtain sufficient display luminance without increasing the peak value of anode voltage, and therefore can be easily actuated by the use of a conventional drive circuit and, in addition, can be very easily connected to the various existing equipment.

Moreover, the device according to the present invention has an excellent effect that it can freely display complicated characters, symbols, etc. or delicate graphic patterns in a natural form and therefore can give a very clear and legible display.

According to the present invention, the pattern display section may be produced integratedly by repeating printing, drying and baking processes of conductive, insulating and fluorescent materials utilizing screen printing; therefore its production process can be remarkably simplified and, in addition, positioning of each anode and grid can be accurately performed. As a result, difficulties in coating of fluorescent material or positioning of each anode and grid heretofore experienced in the production of the matrix-type display device of this kind can be eliminated resulting in an excellent economic effect.

In addition to the above-mentioned basic features, the device according to the present invention may be provided with a plurality of strip-shaped second grids intersectionally to the anode wires with the insulating layer therebetween, the anodes each coated with an insulating layer being positioned at the intersections between the second grids and anode wires. With such an arrangement, the fluorescent layers can be made to luminesce for display by an unique and rational double scanning system in which the primary grids are scanned in a time-sharing manner and, in addition, the second grids also are scanned in a time-sharing manner while the selected primary grids are being actuated; thus the device according to the present invention has excellent effects that the number of drive circuits may be decreased and in addition can display very clear and legible characters, symbols, etc., with such a small number of drive circuits thereby decreasing the circuit cost in terms of economy, that the characters, symbols, graphic patterns may be more easily displayed in a natural form so as to make them very clear; and that the anodes and grids may be simultaneously coated by, for instance, screen printing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A luminescent character display device having a pattern display section composed of a plurality of subsections, one for each digit, said sub-section for each digit being formed of a plurality of anodes disposed in a matrix form and each coated with a fluorescent layer, and said anodes being selectively given anode voltage for display; the device comprising a display tube section composed of an insulating base plate, a plurality of anode wires formed on said base plate and disposed so that they pass the corresponding positions of the respective sub-sections of said pattern display section, an insulating layer laminated on said anode wires and provided with through-holes leading to said anode wires, a plurality of anodes disposed on said insulating layer in a matrix form so as to constitute the sub-section for each digit of the pattern display section and each coated with a fluorescent layer, the anodes disposed at the corresponding positions of the respective sub-sections of the pattern display section being electrically connected in common through the respective anode wires connected thereto through said through-holes, at least one filament cathode provided above said anodes for emitting thermions and bombarding said anodes of said digits with said thermions whereby said fluorescent layer coated on said anodes are excited and made luminous, and a plurality of primary grids disposed between said anodes and said cathode, each said primary grids overlapping all the anodes of only one digit, whereby the thermions emitted from said cathode are selectively accelerated by said grids to the anode of selected digits.

2. A luminescent character display device as set forth in claim 1, further comprising a plurality of strip-shaped second grids disposed on said insulating layer intersectionally with said anode wires and provided with a plurality of windows surrounding the respective anodes on said anode wires.

3. A luminescent character display device as set forth in claim 2, wherein the second grids disposed at the corresponding rows of the respective sub-sections of said pattern display section are connected in common.

4. A luminescent character display device as set forth in claim 2, wherein said anodes and second grids are made of conductive material coated on said insulating layer.

5. A luminescent character display device as set forth in claim 2, further comprising an anode-selecting circuit for giving display information to said anode wires, a primary-grid-selecting circuit for selecting said primary grids in a time-sharing manner, and a second-grid-selecting circuit for selecting said second grids in a time-sharing manner during a period when said primary grids are being selected.

6. A luminescent character display device as set forth in claim 5, wherein said anode wires are divided into a plurality of blocks, a plurality of anode-selecting circuits being provided for giving display information to the respective blocks, the corresponding primary grids of the respective divided blocks being connected in common, and a primary-grid-selecting circuit for selecting in a time-sharing manner said primary grids connected in common.

* * * * *